United States Patent [19]

Michaud

[11] 4,180,837

[45] Dec. 25, 1979

[54] MAGNETIC CODING METHOD

[75] Inventor: André Michaud, Chatenay Malabry, France

[73] Assignee: Transac - Compagnie pour le Developpement des Transactions Automatiques, Paris, France

[21] Appl. No.: 889,083

[22] Filed: Mar. 22, 1978

[30] Foreign Application Priority Data

Mar. 25, 1977 [FR] France .................... 77 08963

[51] Int. Cl.² ............. G11B 5/02; G06K 19/06; G11B 5/09; G11B 25/04
[52] U.S. Cl. ..................... 360/18; 235/493; 360/43; 360/2
[58] Field of Search ............. 235/449, 450, 493; 360/43, 18, 39, 40, 2; 346/74.1

[56] References Cited

U.S. PATENT DOCUMENTS

| 3,571,799 | 3/1971 | Coker, Jr. et al. | 235/449 |
| 3,683,413 | 8/1972 | Schlaepfer | 235/493 |
| 3,790,754 | 2/1974 | Black et al. | 235/493 |
| 4,090,662 | 5/1978 | Fayling | 235/493 |

*Primary Examiner*—Daryl W. Cook
*Attorney, Agent, or Firm*—Sughrue, Rothwell, Mion, Zinn and Macpeak

[57] ABSTRACT

The invention relates to a magnetic coding method. It is characterized by the superposing of a first binary message at a given frequency and a binary message at double frequency in space phase. Application to credit cards with a magnetic track.

3 Claims, 6 Drawing Figures

MAGNETIC CODING METHOD

BACKGROUND OF THE INVENTION

A magnetic track is generally coded according to the technique known as the double frequency technique described in 1954 by AIKEN. According to this method, and by convention, the bit "one" corresponds to a magnetic transition between two clock signals, while the bit "zero" corresponds to the absence of magnetic transition between two clock signals. Hence the term coherent phase double frequency code. In the majority of cases, the coded message is preceded by a series of "zeros" used for synchronizing the clock; the first "one" constitutes the beginning of the useful message.

The applicant has described a method of recording a message and making the recorded data indelible, in U.S. Ser. No. 846,088 entitled "A method for producing permanent magnetic recordings."

In this type of recording, a magnetic ink track is divided into various zones and in each zone, the magnetic particles contained in the ink are "frozen" in one of the two directions, for example at 90 degrees to each other.

It is shown, in that application, how such a magnetic track can be coded in a manner analogous to the double frequency code:

to obtain a binary "zero," a given length of track has particles all oriented in the same way; and to obtain a binary "one," a same length of track is divided into two portions of equal length in each of which all the particles have the same orientation, the orientations being different in the two portions.

In general, the coding is effected at density of 75 bits per inch; the result of this is that two clock signals are separated by the time required to read a length of track equal to 0.34 mm.

Preferred applications of the present invention enable a second message to be superposed on such a "frozen" message. In particular the present invention provides a method of coding and recording two independent messages on a single magnetic track of polymerisable ink, each message being in the form of a binary number; the method comprising the following operations:

(1) the first message is recorded by; subdividing the track into successive zones of length a or a/2 chosen according to the bits of the message, imparting one of two different magnetic orientientations to the particles of the polymerizable ink in alternate zones, and immobilizing the oriented particles by polymerizing the ink; and (2) the second message is recorded in a double frequency code at a frequency such that one binary digit is written in each of the zones of length a/2 of the track and two binary digits were written in each of the zones of length a.

The magnetizations of the second method are preferably in the longitudinal direction with the air gap oriented transversally as usual.

On re-reading the magnetizations of the second message on the longitudinally oriented zones of the first message will appear 20° to 30° greater than in the transversally oriented zones of the first message.

Indeed, the particles which can be oriented either parallel to the track or perpendicular to the track, within the magnetic ink, are capable of being magnetized parallel to the track in one direction or in the other.

In this way, it is possible to record any succession of 2n bits, whether "1s" or "0s" on any frozen combination of n bits, whether "1s" or "0s."

The message superposed on the frozen message can be erased, since it is recorded in a conventional manner. It will be designated by the expression "variable message.".

Such a superposition of two messages, the one frozen, the other variable, provides numerous advantages, in particular in its application to credit cards with magnetic tracks. Already these cards bear:

"invariable" data (for example: card number, account number, validity date, type of transaction authorized, etc.). This data is not modified during the use of the magnetic medium; and "variable" data (for example: date of the last transaction, authorized balance, transaction number, etc.). This data is modified, brought up to date and magnetically written on the magnetic medium at each use.

It should be observed that the invariable and the variable data are written in general on two distinct tracks, but sometimes they are written in only one message which is hence modified and rewritten in full at each use.

Preferred applications of the present invention make it possible to cumulate the following advantages:

a. A single track bears simultaneously the invariable data and the variable data. The variable data is superposed on the invariable data. For a given quantity of data, the system in accordance with the invention allows a low writing density to be used. It can enable one track together with one reading head and its associated electronics to be saved.

b. The invariable data is "fixed" to the medium and it is possible to authenticate it by simple means.

c. The type of writing and of reading in accordance with the invention is simultaneously sufficiently close to the "double frequency" coding to benefit from the known advantages thereof and sufficiently distinct to be completely illegible according to conventional techniques. This adds an element of security which it is impossible to obtain by conventional double-frequency coding.

d. The system in accordance with the invention makes it possible to produce a highly reliable assembly while using very simple equipment and without using accessories or contrivances which are necessarily more expensive and less reliable.

The invention will be described in relation to an example in which the method is applied to a credit card.

Reference will be made to the accompanying drawings.

DESCRIPTION OF THE PREFERRED EMBODIMENT

The example of application chosen is that of a credit card bearing invariable data together with variable data.

Let it be supposed that the beginning of the message relating to the invariable data is, in binary code, the number 01101.

Figure 1:
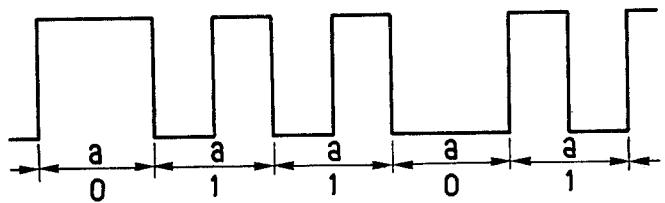
FIG. 1 is a diagram which represents a first (frozen) message to be recorded.

This number is represented conventionally in the diagram of FIG. 1. In a length a of the track (at a given writing speed), there is one transition for a binary "1" and no transition for a binary "0."

Figure 2:
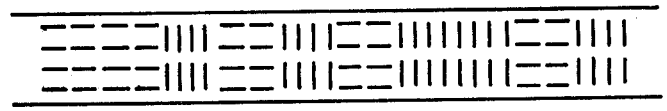
FIG. 2 is a diagram of the magnetic track with its particles oriented so as to form the first message.

In the case of the invariable message, the transitions are in the form of changes in the orientation of the particles:

Thus, in FIG. 2 showing the state of orientation of the particles of the track, the particles oriented parallel to the length of the track are distinguished from the particles oriented perpendicularly.

This orientation is obtained, as described in the above-mentioned patent application, by two successive applications of a uniform magnetic field through a mask, each followed by polymerisation of the magnetic ink.

Figure 3:
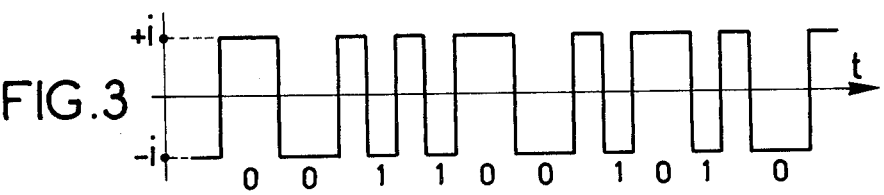
FIG. 3 shows the magnetizing current as a function of time used for recording the second message whose contents can be completely independent from the frozen message.

Let it be supposed that the variable message is 0011001010, as shown in FIG. 3.

It is recorded in a conventional manner on the track and in space phase with the first.

Figure 4:
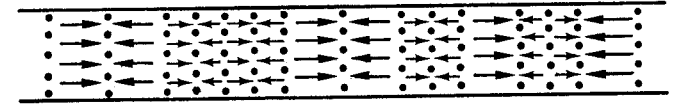
FIG. 4 shows the state of magnetization of the magnetic particles of the track after recording of the second message.

The magnetic particles oriented parallel to the axis of the track adopt a magnetic moment shown in FIG. 4 by a long arrow; the magnetic particles oriented perpendicularly to the axis of the track adopt a magnetic moment whose component parallel to the axis of the track, which is the only useful component, is shown by a short arrow.

Figure 5:
FIG. 5 shows the reading current of the track as a function of time.

On reading the message, the signal obtained is shown in FIG. 5. This signal has three levels of amplitude which correspond to the transitions between two large moments, between a large moment and a small moment and between two small moments.

Figure 6:
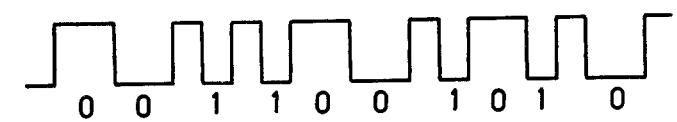
FIG. 6 shows the reading signal after rectification and shaping.

Suitably rectified and clipped, it reconstitutes the recorded message, as shown in FIG. 6.

At the speed of 100 mm/sec for recording the variable message and at the density of 75 bits per inch the distance and the time which separate two transitions is given by the following table:

Invariable message
    binary "0" 0.34 mm 3400 microseconds
    binary "1" 0.17 mm 1700 microseconds
Variable message
    binary "0" 0.17 mm 1700 microseconds
    binary "1" 0.085 mm 850 microseconds
    These values can, of course, be modified.

The messages are read by means of a conventional reading head, in two phases:

(1a) The track is read, this giving the number shown in FIG. 6, which is stored in a register;

(1b) The variable message is erased and only the message such as shown in FIG. 1 subsists; and (2) The invariable message is read.

In one variant, a plurality of distinct specialized heads can be used for reading, writing or erasing.

What is claimed is:

1. A method of coding and recording two independent messages on a single magnetic track of polymerizable ink having particles with a privileged direction of magnetization corresponding to their largest dimension, each message being in the form of a binary number; the method comprising the following steps:

recording the first message by subdividing the track into successive zones of length a or a/2 chosen according to the bits of the message, imparting one of two different magnetic orientations to the particles of the polymerizable ink in alternate zones, and immobilizing the oriented particles by polymerizing the ink; and recording the second message in terms of magnetic moment having a usable component parallel to the axis of the track on said oriented particles in a double frequency code at a frequency such that one binary digit is written in each of the zones of length a/2 of the track and two binary digits are written in each of the zones of length a.

2. A method according to claim 1, wherein the magnetic head used for writing the second message has its air gap oriented transversely.

3. A method of reading two independent messages recorded on a single magnetic track of polymerizable ink having particles with a privileged direction of magnetization corresponding to their largest dimension, each message being in the form of a binary number, the recording method comprising the following steps:

recording the first message by subdividing the track into successive zones of length a or a/2 chosen according to the bits of message, imparting one of two different magnetic orientations to the particles of the polymerizable ink in alternate zones and immobilizing the oriented particles by polymerizing the ink; and recording the second message in terms of magnetic moment having a usable component parallel to the axis of the track on said oriented particles in a double frequency code at a frequency such that one binary digit is written in each of the zones of length a/2 of the track and two binary digits are written in each of the zones of length a;

said method of reading said two messages comprising the following phases in order:

(1) reading the second message;
    (2) erasing the second message; and
    (3) reading the first message.

* * * * *